United States Patent
Nicholson et al.

(10) Patent No.: US 9,778,633 B2
(45) Date of Patent: Oct. 3, 2017

(54) DIRECT ADDRESS LASER ABLATION

(75) Inventors: Verner Steve Nicholson, Pelzer, SC (US); James Edward Stone, Greenville, SC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 566 days.

(21) Appl. No.: 14/304,179

(22) PCT Filed: Dec. 22, 2011

(86) PCT No.: PCT/US2011/066699
§ 371 (c)(1),
(2), (4) Date: Jun. 13, 2014

(87) PCT Pub. No.: WO2013/095479
PCT Pub. Date: Jun. 27, 2013

(65) Prior Publication Data
US 2014/0379116 A1 Dec. 25, 2014

(51) Int. Cl.
*G05B 15/02* (2006.01)
*B29D 30/06* (2006.01)
(Continued)

(52) U.S. Cl.
CPC .............. *G05B 15/02* (2013.01); *B23K 26/08* (2013.01); *B23K 26/082* (2015.10);
(Continued)

(58) Field of Classification Search
CPC .................... B60C 99/00; B29D 2030/0638
(Continued)

(56) References Cited

U.S. PATENT DOCUMENTS

| 4,016,020 A | 4/1977 | Ongaro |
| 4,414,843 A | 11/1983 | Kounkel |

(Continued)

FOREIGN PATENT DOCUMENTS

| JP | 2000055766 | 2/2000 |
| JP | 2006018374 | 1/2006 |

(Continued)

OTHER PUBLICATIONS

PCT International Search Report for PCT/US2011/066699, dated Apr. 26, 2012.

*Primary Examiner* — Mohammad Ali
*Assistant Examiner* — Emilio J Saavedra
(74) *Attorney, Agent, or Firm* — Dority & Manning, P.A.

(57) ABSTRACT

A system and method for selectively removing tire material from the bead portions of a cured tire to reduce one or more harmonics of at least one uniformity parameter are disclosed. According to aspects of the present disclosure, tire material is selectively removed using a plurality of direct address commands. The direct address commands specify ablation parameters for discrete ablation segments at specific angular locations around the bead of the tire. The direct address commands are generated by analyzing the desired ablation pattern for the bead of the tire. The ablation device can then be controlled to selectively remove tire material in discrete ablation segments at identified addresses pursuant to the direct address commands to achieve the desired ablation pattern on one or more tracks along the bead portion of the tire using a single pass of the ablation device.

15 Claims, 8 Drawing Sheets

(51) Int. Cl.

| | |
|---|---|
| *B23K 26/08* | (2014.01) |
| *B60C 99/00* | (2006.01) |
| *B23K 26/361* | (2014.01) |
| *B23K 26/082* | (2014.01) |
| *B23K 26/402* | (2014.01) |
| *B23K 26/362* | (2014.01) |
| *B23K 103/00* | (2006.01) |

(52) U.S. Cl.
 CPC .......... *B23K 26/361* (2015.10); *B23K 26/362* (2013.01); *B23K 26/402* (2013.01); *B29D 30/0633* (2013.01); *B60C 99/00* (2013.01); *B23K 2203/30* (2015.10); *B23K 2203/42* (2015.10); *B23K 2203/50* (2015.10); *B29D 2030/0638* (2013.01)

(58) Field of Classification Search
 USPC ........................................................ 700/160
 See application file for complete search history.

(56) References Cited

U.S. PATENT DOCUMENTS

| | | |
|---|---|---|
| 4,722,064 A | 1/1988 | Suzuki |
| 4,964,067 A | 10/1990 | Honickman |
| 5,345,391 A | 9/1994 | Hull |
| 5,478,426 A * | 12/1995 | Wiler ..................... B41M 5/24 |
| | | 152/523 |
| 5,523,543 A | 6/1996 | Hunter |
| 5,537,866 A | 7/1996 | Bangert |
| 5,891,131 A | 4/1999 | Rajan |
| 6,774,337 B2 | 8/2004 | Claydon |
| 6,870,604 B2 | 3/2005 | Kanatake |
| 7,467,075 B2 | 12/2008 | Humphries |
| 7,676,177 B2 | 3/2010 | Elliot |
| 2008/0032066 A1 | 2/2008 | Stiblert |
| 2010/0268225 A1 | 10/2010 | Coe |
| 2012/0095587 A1* | 4/2012 | Hair, Jr. ............... G01M 17/024 |
| | | 700/110 |

FOREIGN PATENT DOCUMENTS

| | | |
|---|---|---|
| WO | WO 9739321 | 10/1997 |
| WO | WO 2011/002596 | 1/2011 |

* cited by examiner

DIRECT ADDRESS LASER ABLATION

FIELD OF THE INVENTION

The present disclosure relates generally to systems and methods for improving tire uniformity by selective removal of material along tire bead locations in a cured tire.

BACKGROUND OF THE INVENTION

Tire non-uniformity relates to the symmetry (or lack of symmetry) relative to the tire's axis of rotation in certain quantifiable characteristics of a tire. Conventional tire building methods unfortunately have many opportunities for producing non-uniformities in tires. During rotation of the tires, non-uniformities present in the tire structure produce periodically-varying forces at the wheel axis. Tire non-uniformities are important when these force variations are transmitted as noticeable vibrations to the vehicle and vehicle occupants. These forces are transmitted through the suspension of the vehicle and may be felt in the seats and steering wheel of the vehicle or transmitted as noise in the passenger compartment. The amount of vibration transmitted to the vehicle occupants has been categorized as the "ride comfort" or "comfort" of the tires.

Tire uniformity characteristics, or attributes, are generally categorized as dimensional or geometric variations (radial run out (RRO) and lateral run out (LRO)), mass variance, and rolling force variations (radial force variation, lateral force variation and tangential force variation, sometimes also called longitudinal or fore and aft force variation). Uniformity measurement machines often measure the above and other uniformity characteristics by measuring force at a number of points around a tire as the tire is rotated about its axis.

Once tire uniformity characteristics are identified, correction procedures may be able to account for some of the uniformities by adjustments to the manufacturing process. Some of the uniformities may be hard to correct during the manufacturing process and so additional correction procedures are needed to correct remaining non-uniformities of cured tires. A number of different techniques may be available, including but not limited to the addition and/or removal of material to a cured tire and/or deformation of a cured tire.

One known technique for correcting tire non-uniformities is the use of laser ablation along a bead portion of the tire. For instance, WO 2011/002596, which is incorporated by reference herein for all purposes, discloses the use of laser ablation along various tracks on the bead portion of a tire, such as along the bead seat portion, the lower flange portion, and the upper flange portion of the tire. In particular, an ablation pattern for the tire beads is calculated to reduce the magnitude of one or more harmonics of at least one uniformity parameter. Material along the bead portion of the tire is then selectively removed using the calculated laser ablation pattern.

Known ablation techniques typically use either a variable speed approach or a variable power approach to selectively remove material according to the calculated ablation pattern. In a variable speed approach, the ablation device is operated at a fixed power level while selectively rotating the tire with variable rotational speed to achieve the desired ablation pattern. In a variable power approach, the tire is rotated at a fixed speed and the ablation device is powered at varied levels to accomplish the desired ablation pattern. Combined variations of both power and speed can also be used.

These ablation techniques can typically only ablate a single track along the bead portion of the tire during a single pass of the ablation device. Multiple passes of the ablation device around the tire can be required to ablate multiple tracks along, for instance, two or more of the bead seat portion, the lower flange portion, and the upper flange portion, leading to increased processing time. Use of lower power ablation in variable power ablation processes can lead to even further increased processing times to achieve a desired ablation pattern. It can also be difficult to simultaneously implement multiple objective ablation patterns, for instance to correct both radial force and lateral force parameters, in a single pass of the ablation device using variable power or variable speed ablation techniques.

Thus, a need exists for an ablation technique that reduces the time necessary to achieve a desired ablation pattern in the bead portion of a tire. A technique that can address multiple uniformity parameters and ablate multiple tracks along the bead portion of a tire during a single pass would be particularly useful. A technique that can allow the independent ablation of both beads of the tire at the same time would also be particularly useful.

SUMMARY OF THE INVENTION

Aspects and advantages of the invention will be set forth in part in the following description, or may be obvious from the description, or may be learned through practice of the invention.

One exemplary aspect of the present disclosure is directed to a method for reducing one or more harmonics of at least one uniformity parameter in a cured tire. The method includes receiving an ablation pattern for a bead of the tire. The ablation pattern defines a desired ablation depth relative to an angular location around the bead and is calculated to correct for one or more harmonics of at least one uniformity parameter for the tire. The method includes identifying a plurality of addresses for the bead. Each address is associated with a specific angular location on the bead of the tire. The method includes analyzing the ablation pattern to determine a plurality of direct address commands to achieve the ablation pattern. The plurality of direct address commands specify ablation parameters for discrete ablation segments at one or more addresses along the bead of the tire. The plurality of discrete ablation segments can have similar ablation sensitivity characteristics, such as similar ablation segment depths, such as an ablation segment depth associated with about full operating power of the ablation device. The method further includes controlling the ablation device to selectively remove tire material from the bead in discrete ablation segments pursuant to the direct address commands to achieve the ablation pattern.

In a particular implementation, analyzing the ablation pattern to determine a plurality of direct address commands can include assigning a discrete ablation segment to an address based at least in part on ablation sensitivity characteristics associated with the ablation segment; and generating a direct address command for each discrete ablation segment assigned to an address.

For instance, analyzing the ablation pattern to determine a plurality of direct address commands can include assigning one or more discrete ablation segments to at least one of the plurality of addresses in a first ablation segment layer based at least in part on an ablation segment depth associated with the discrete ablation segments; subtracting the ablation segment depth of the discrete ablation segments in the first layer from the desired ablation depth at each address to achieve an adjusted ablation depth for each address; and assigning discrete ablation segments to at least one of the plurality of addresses in a second ablation segment layer based at least in part on the adjusted ablation depth.

The angular locations associated with the discrete ablation segments in the first layer can be shifted relative to the angular locations associated with the discrete ablation segments in the second layer. The discrete ablation segments can also be arranged in at least four ablation segment layers. For instance, the method can include adjusting the ablation sensitivity characteristics of the discrete ablation segments such that at least four ablation segment layers are required to achieve the ablation pattern.

Another exemplary aspect of the present disclosure is directed to a uniformity correction system for reducing the magnitude of one or more harmonics of at least one uniformity parameter in a tire according to an ablation pattern for a bead of the tire. The system includes a tire fixture on which a tire can be securely mounted, and an ablation device configured to provide ablation of the bead of a tire mounted on the tire fixture. The system further includes a control system coupled to the ablation device. The control system is configured to control the ablation device pursuant to a plurality of direct address commands to selectively remove material in discrete ablation segments at specific angular addresses along the bead to achieve the ablation pattern.

For instance, in a particular implementation, the control system controls the ablation device to selectively remove tire material according to a plurality of ablation patterns for the bead using a single pass of the ablation device around the bead. Each ablation pattern in the plurality of ablation patterns is designed for ablation at a different track location in at least one or more of the bead seat, low flange zone and high flange zone of the bead.

In another particular implementation, the system includes a second ablation device configured to provide ablation of a second bead of a tire mounted on the tire fixture. The control system can be configured to independently control ablation of the second bead with the second ablation device.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 3 depicts an exemplary ablation pattern calculated to reduce one or more harmonics of selected tire uniformity parameters according to an exemplary aspect of the present disclosure. FIG. 3 plots the desired ablation depth (D) along the abscissa and the angular location (θ) around the bead of the tire along the ordinate.

FIG. 6 provides a graphical illustration of ablation depth represented by the grayscale image of FIG. 5. FIG. 6 plots the vertical position (H) of the bitmap image along the abscissa and the ablation depth (d) along the ordinate.

FIGS. 9-12 graphically depicts exemplary aspects of method of generating a plurality of direct address commands to control the ablation of a tire bead according to an exemplary embodiment of the present disclosure. FIGS. 9-12 plot ablation depth (D) along the abscissa and the angular location (θ) around the bead of the tire along the ordinate.

FIG. 13 depicts an exemplary ablation segment stack determined according to an exemplary embodiment of the present disclosure. FIG. 13 plots ablation depth (D) along the abscissa and the angular location (θ) around the bead of the tire along the ordinate.

FIGS. 14-15 graphically depict exemplary ablation segment stacks to achieve exemplary ablation patterns according to exemplary aspects of the present disclosure. FIGS. 14-15 plot ablation depth (D) along the abscissa and the angular location (θ) around the bead of the tire along the ordinate.

DETAILED DESCRIPTION OF THE PREFERRED EMBODIMENTS

It is to be understood by one of ordinary skill in the art that the present discussion is a description of exemplary embodiments only, and is not intended as limiting the broader aspects of the present invention. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a system and method for selectively removing tire material from the bead portions of a cured tire to reduce one or more harmonics of at least one uniformity parameter. According to aspects of the present disclosure, tire material is selectively removed using a plurality of direct address commands. The direct address commands specify ablation parameters for discrete ablation segments at specific angular locations around the bead of the tire.

The direct address commands are generated by analyzing the desired ablation pattern for the bead of the tire. In particular, the ablation pattern is broken down into a plurality of discrete ablation segments. The discrete ablation segments each have similar ablation sensitivity characteristics. The ablation sensitivity characteristics can include the ablation force per pass and/or the ablation depth per pass of the ablation device. The ablation sensitivity characteristics can be controlled based on operating parameters of the ablation device. For instance, the ablation sensitivity characteristics can be controlled as a function of an operating parameter for the ablation device, such as the power and/or scan rate of the ablation device.

The ablation segments are assigned to individual addresses at angular locations around the bead of the tire based at least in part on the ablation sensitivity characteristics associated with the discrete ablation segments. A direct address command is generated for each discrete ablation segment. The direct address command specifies ablation parameters, such as laser power, laser scan rate, bit map, radial location on the bead of the tire, and other parameters for the ablation segment. The ablation device is then controlled to selectively remove tire material in discrete ablation segments at identified addresses pursuant to the direct address commands to achieve the desired ablation pattern.

The direct address approach provides many advantages. For instance, the ablation device can be controlled to directly go to areas on the bead of the tire that requires ablation. As a result, the ablation device can simply skip over significant sections of the bead that do not require ablation, leading to reduced processing time. In addition, one pass around the bead can allow correction on multiple desired tracks of the bead, such as on one or more of the bead seat portion, lower flange portion, or upper flange portion. In particular, since there is no continuous rotation of the tire, as in prior ablation systems, the ablation device can stay at a particular angular address and remove tire material from different tracks on the bead at the particular angular address.

Moreover, because the discrete ablation segments have similar ablation sensitivity characteristics, the processing time for achieving a desired ablation pattern can be improved. For instance, the direct address commands can control the ablation device to selectively remove tire material in discrete ablation segments associated with the full operating power of the ablation device. This allows for a reduced number of ablation segments to achieve a desired ablation pattern, leading to even further reduced cycle time. It is also reduces the need to dynamically adjust the operating parameters for the ablation device as the ablation device is selectively removing tire material from the discrete ablation segments pursuant to the direct address commands.

Figure 1:
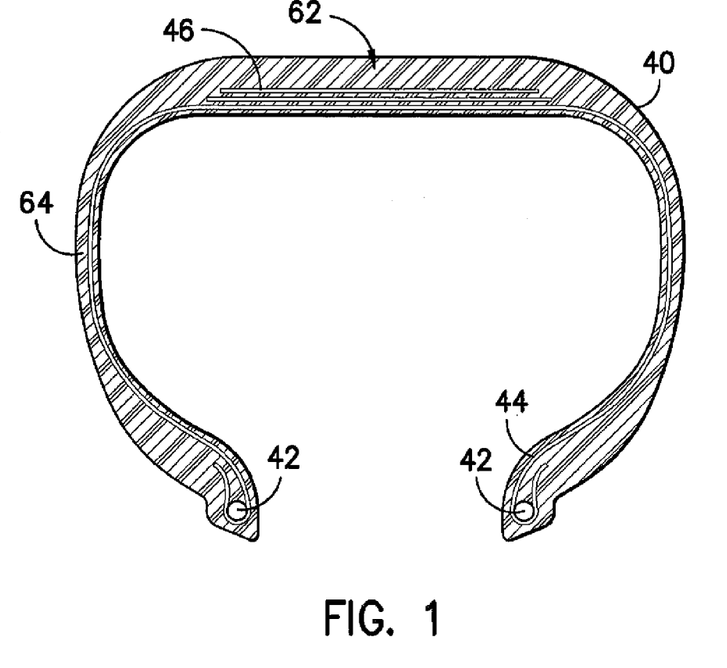
FIG. 1 is a cross-sectional view of a radial tire, which can be corrected according to exemplary aspects of the present disclosure.

With reference now to the figures, exemplary embodiments of the present disclosure will now be discussed in detail. FIG. 1 provides a schematic illustration of a radial pneumatic tire 40 for uniformity correction in accordance with the present invention. The tire 40 is rotatable about a longitudinal central axis of rotation. The tire 40 includes a pair of bead wires 42 which are substantially inextensible in a circumferential direction. The first and second beads 42 are spaced apart in a direction parallel to the central axis. Circumferential is defined as being substantially tangent to a circle having its center at the axis and contained in a plane parallel to the mid-circumferential plane of the tire.

A carcass ply 44 extends between each of the respective beads 42. The carcass ply 44 has a pair of axially opposite end portions which extend around the respective bead 42. The carcass ply 44 is secured at the axially opposite end portions to the respective bead 42. The carcass ply 44 includes a plurality of substantially radially extending reinforcing members each of which are made of a suitable configuration and material, such as several polyester yarns or filaments twisted together. It will be apparent that the carcass ply 44 is illustrated as a single ply but may include any appropriate number of carcass plies for the intended use and load of the tire 40. It will also be apparent that the reinforcing member may be a monofilament or any other suitable configuration or material.

The tire 40 illustrated also includes a belt package 46. The belt package 46 includes at least two annular belts. One of the belts is located radially outwardly of the other belt. Each belt includes a plurality of substantially parallel extending reinforcing members made of a suitable material, such as steel alloy. The tire 40 also includes rubber for the tread 62 and sidewalls 64. The rubber may be of any suitable natural or synthetic rubber, or combination thereof.

Figure 2:
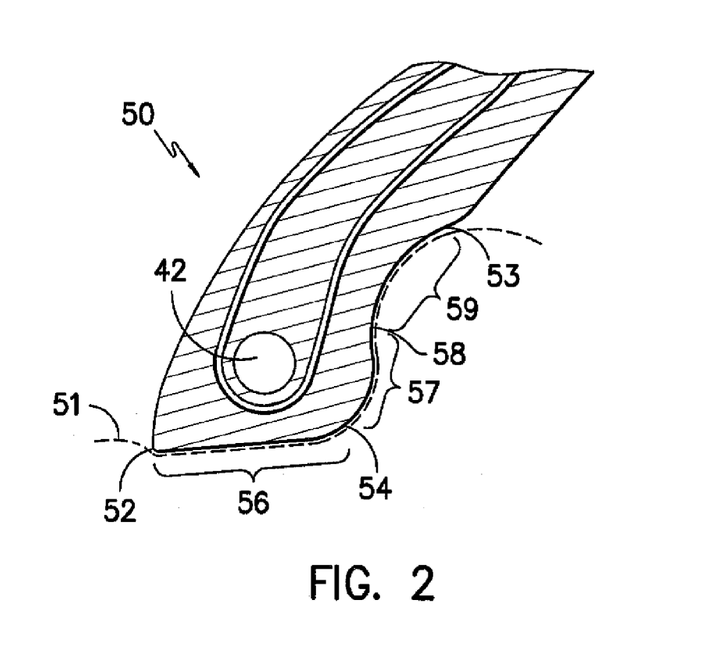
FIG. 2 depicts multiple track locations along the bead of the tire suitable for ablation to reduce one or more harmonics of selected tire uniformity parameters according to exemplary aspects of the present disclosure.

FIG. 2 provides a magnified cross-sectional view of a tire bead, generally showing the various portions of such tire portion relative to its seated location on a wheel rim. For example, each tire bead area 50 includes a tire bead 42 and its surrounding rubber portions that are configured to define a bead profile as shown in FIG. 2. In general, the profile portion of the tire bead between toe 52 and an exit point 53 is fitted against a portion of a wheel rim for secure mounting thereto. Dotted line 51 represents an exemplary portion of a wheel rim against which tire bead area 50 may be secured for mounting. The bottom surface of the bead profile generally defined between toe 52 and heel 54 is referred to herein as the bead seat 56. The profile portion between heel 54 and exit point 53 is referred to generally as the flange, and includes a lower flange portion 57 between the heel and a flange transition point 58 and an upper flange portion 59 between the flange transition point 58 and the exit point 53.

As discussed in more detail in WO 2011/002596, which is commonly assigned to the assignee of the present disclosure, one or more harmonics of selected uniformity parameters can be reduced by selectively removing material from one or more of the bead seat 56, lower flange portion 57, and upper flange portion 59 of the bead area 50 of the tire. Tire uniformity characteristics that may be corrected generally include rolling force variations such as radial force variation and lateral force variation and even other parameters including but not limited to mass variance.

Figure 3:
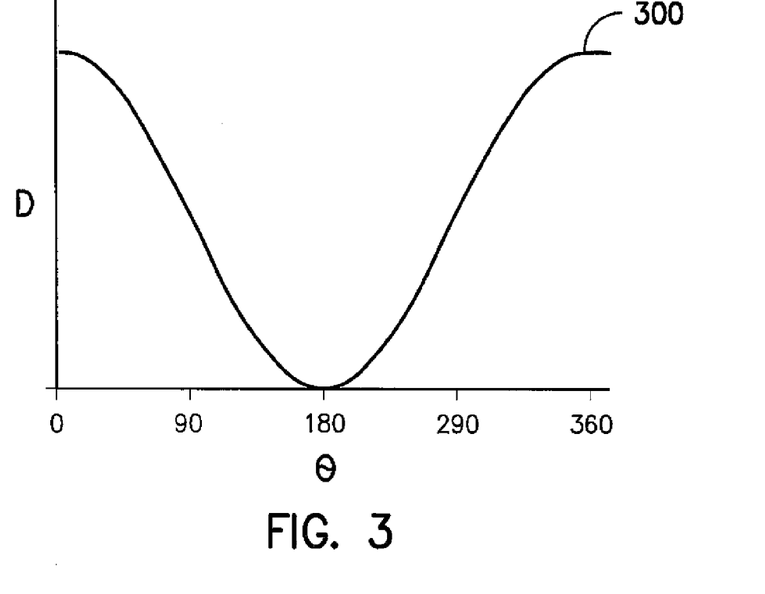

In accordance with aspects of the present disclosure, material from the tire beads can be removed according to a calculated ablation pattern. An exemplary ablation pattern 300 is depicted in FIG. 3. As shown, the exemplary ablation pattern 300 defines a desired ablation depth relative to an angular location around the bead of the tire. The ablation pattern 300 can be used to reduce, for instance, a first harmonic associated with a uniformity characteristic, such as radial force associated with a tire. Material can be selectively removed from one or more of the bead seat 56, lower flange portion 57, and upper flange portion 59 to achieve the desired ablation depths at the angular locations set forth in the ablation pattern. Selectively removing material along multiple tracks is intended to achieve a desired level of force or combination of forces when appropriate patterns are ablated on the beads.

The exemplary ablation pattern 300 shown in FIG. 3 can be calculated according to any known techniques. For instance, the exemplary ablation pattern can be determined by identifying one or more uniformity parameters and a selected number of harmonics for each parameter for which correction is desired. The ablation pattern can be calculated to correct for the selected number of harmonics for each identified uniformity parameter. Exemplary techniques for calculating an ablation pattern are disclosed in WO 2011/002596, which is incorporated herein by reference for all purposes.

Tire material can be selectively removed from the bead of the tire according to the calculated ablation pattern using a plurality of ablation techniques. For instance, in one embodiment, tire material can be selectively removed using laser ablation techniques. Laser ablation techniques can be preferable because it is able to accomplish removal of discrete ablation segments around the bead of the tire with precise control. To the extent that other rubber removal techniques, such as but not limited to grinding, sandblasting, water jet removal and the like may be implemented to achieve the same precision levels as laser ablation, the present subject matter may also employ such alternative removal techniques.

Figure 4:
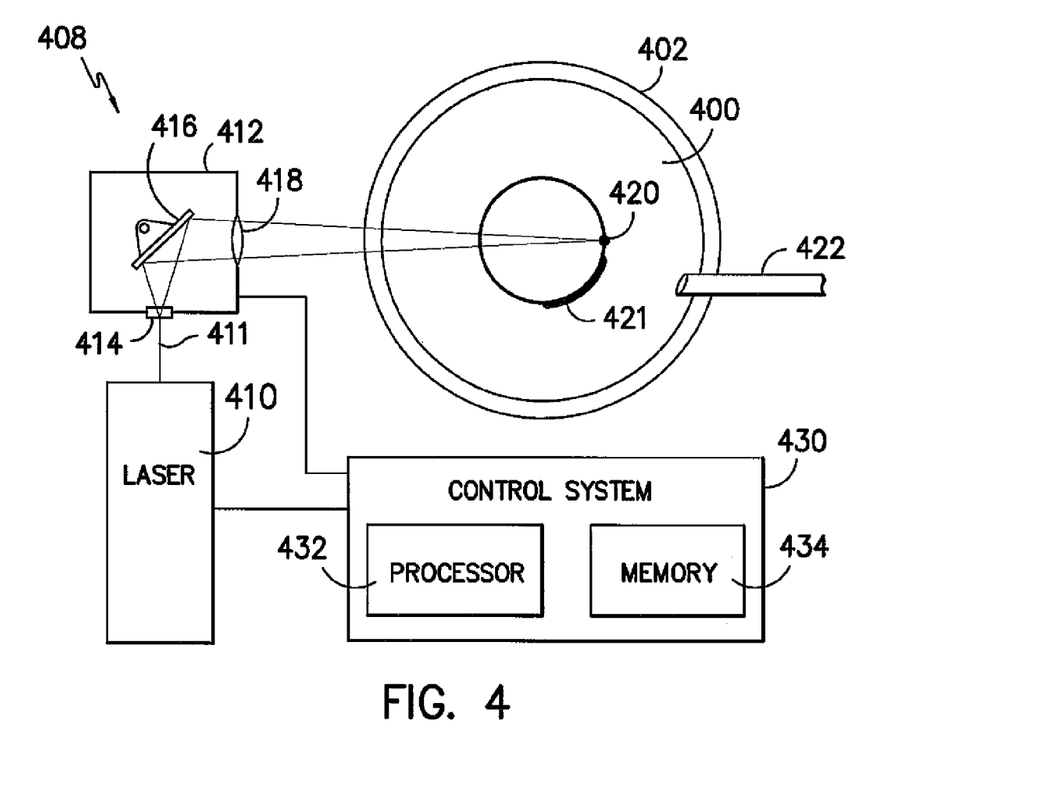
FIG. 4 depicts a block diagram of a system according to an exemplary embodiment of the present disclosure.

FIG. 4 illustrates an exemplary block diagram of a system for reducing selected harmonics of identified uniformity parameters using laser ablation. As shown, a tire 400 is securely mounted to a mounting fixture 402, which generally serves as a stationary hub to hold the tire bead stationary relative to a laser ablation device 408. Laser ablation device 408 can include a laser 410, which can include a fixed-point or sheet-of-light laser system that outputs a laser beam 411 having a sufficient amount of power to perform selective removal of tire rubber material. In one particular example, laser ablation device 410 can include a carbon dioxide ($CO_2$) laser. After output by laser ablation device 410, laser beam 411 can be provided to a deflection element 412, which can include a beam splitter 414, deflector 416, imaging lens 418, and/or other optical elements. Imaging lens 418 focuses the illumination of the laser beam 411 to a focal point 420 on the tire 400 to remove rubber in an ablated area 421 along a tire bead.

The system of FIG. 4 is intended to illustrate laser ablation using a single laser and single focal point (i.e., removal at one tire bead at a time). However, it should be appreciated that multiple lasers be used to perform ablation at multiple focal points (e.g., at both tire beads). For instance, in a particular embodiment, a first laser can be used to independently provide ablation of a first tire bead and a second laser can be used to independently provide ablation of a second tire bead. A vacuum 422 or other cleaning tool may be provided to extract any removed rubber or other waste from the ablation area. Additional outlets may provide a controlled output of gaseous medium (e.g., a nitrogen gas) to facilitate laser ablation and suppress potential flames at the ablation point.

As shown in FIG. 4, a control system 430 controls one or more components of laser ablation device 408 to achieve the desired ablation pattern along one or more tracks along the bead of the tire. Control system 430 can generally include such components as at least one memory/media element or database for storing data and software instructions as well as at least one processor.

In the particular example of FIG. 4, a processor(s) 432 and associated memory 434 are configured to perform a variety of computer-implemented functions (i.e., software-based data services). The memory 434 can store software and/or firmware in the form of computer-readable and executable instructions that will be implemented by the processor(s) 432. Memory 434 can also store data which is accessible by processor(s) 432 and which can be acted on pursuant to the software instructions stored in the memory 434. Memory 434 can be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others.

According to aspects of the present disclosure, memory 434 can store a plurality of direct address commands used to control the ablation device 408 to achieve a desired ablation pattern on the bead of the tire. The direct address commands can specify operating parameters for discrete ablation segments at specific angular locations or "addresses" on the bead of the tire. More particularly, the desired ablation pattern can be broken down into a plurality of discrete ablation segments. These ablation segments represent small portions of the total ablation pattern that will be removed in incremental fashion by the ablation device. The direct address commands specify locations and other parameters for the plurality of discrete ablation segments to achieve a desired ablation pattern.

Figure 5:
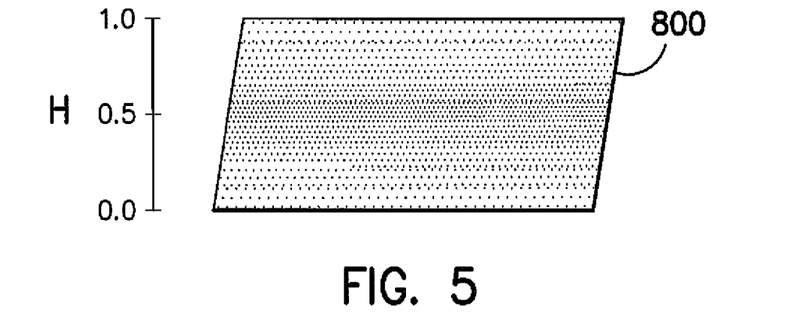
FIG. 5 illustrates an exemplary ablation segment in the form of a grayscale bitmap image. The grayscale bit map image is plotted relative to the vertical position (H) of the bitmap image.

In a particular example, the ablation segments can be associated with a bitmap image which correlates the ablation depth along a specified track to a varied-tone graphic image (e.g., having color or grayscale variations) representative of such depths. Such varied-tone images can be interpreted by software control of the ablation device to produce desired ablation depths at specific angular locations on the bead of the tire. FIG. 5 shows an exemplary grayscale bitmap image for a particular discrete ablation segment 800 that may be performed by a laser in accordance with some particular embodiments of the present invention. In such ablation segment, the lower dot density representative of lighter grayscale tones correspond to smaller ablation depths and higher dot density representative of darker grayscale tones correspond to larger ablation depths.

Figure 6:
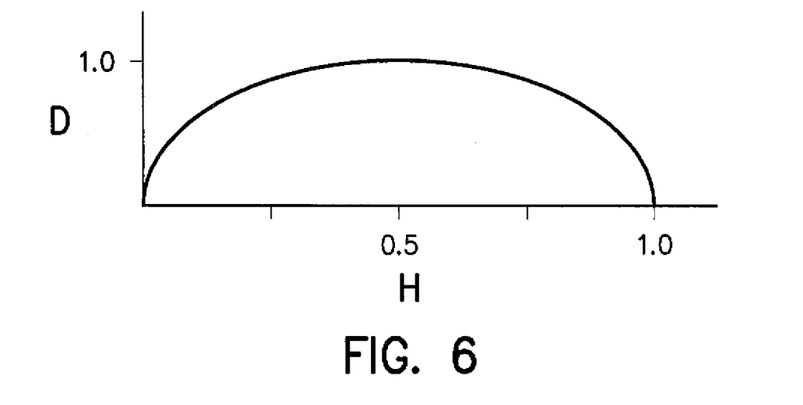

FIG. 6 provides a graphical example of the ablation depths represented by the dotted/grayscale image of FIG. 5. Assume, for example, that the highest dot density representing a darkest grayscale tone shown in FIG. 5 corresponds to an ablation depth of 1 mm, such that the darkest portion of the image occurs around the middle of the vertical range from top to bottom of the bitmap image. The corresponding graph in FIG. 6 plots the vertical position of the bitmap image along the abscissa and the ablation depth (e.g., in mm) along the ordinate. As shown, the variation in ablation depth follows a generally smooth transitional curve as opposed to sharp contrasting regions.

Having a curved (almost sinusoidal) path for the ablation depth may be advantageous by providing smooth edge profiles in the ablation area. Elimination of sharp edges in the ablation patterns makes for a smoother, more undetectable (thus visually appealing) uniformity correction. It also reduces possible changes to the bead seating force and tire pressure levels when the tire beads are subsequently mounted to a rim. Further reduction to any potential parasitic changes to other uniformity parameters may also be achieved in part by smooth profiles and overall limited ablation depths.

Figure 7:
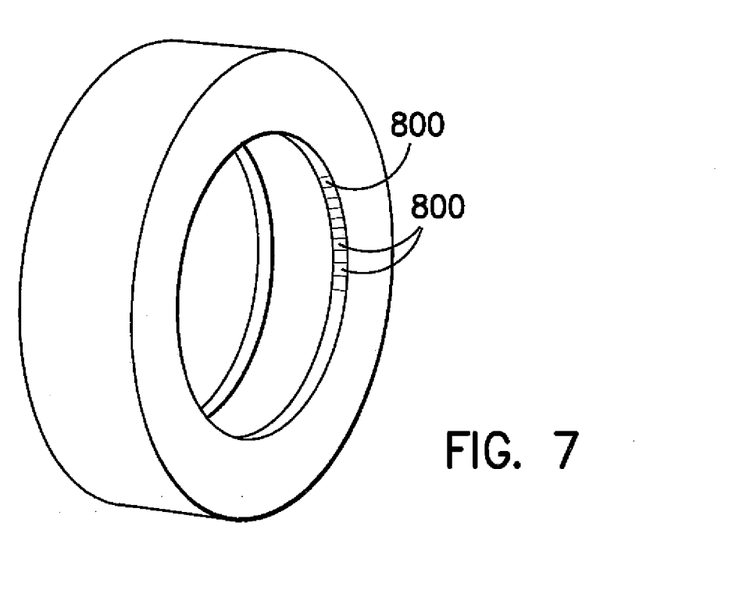
FIG. 7 provides a perspective view of multiple ablation segments removed along a tire bead.

FIG. 7 generally illustrates how multiple ablation segments 800 can be transposed along a bead surface. Although only a single row of ablation segments is illustrated along a tire bead, it should be appreciated that multiple rows and columns of such ablation patterns may exist to achieve the desired ablation pattern. Such groupings of ablation patterns may also be correlated to more than one track/area along a tire bead. For example, one set of ablation segments may be translated from an ablation pattern along a tire bead seat zone, while another set of ablation segments may be translated from an ablation pattern along a tire bead flange zone.

Figure 13:
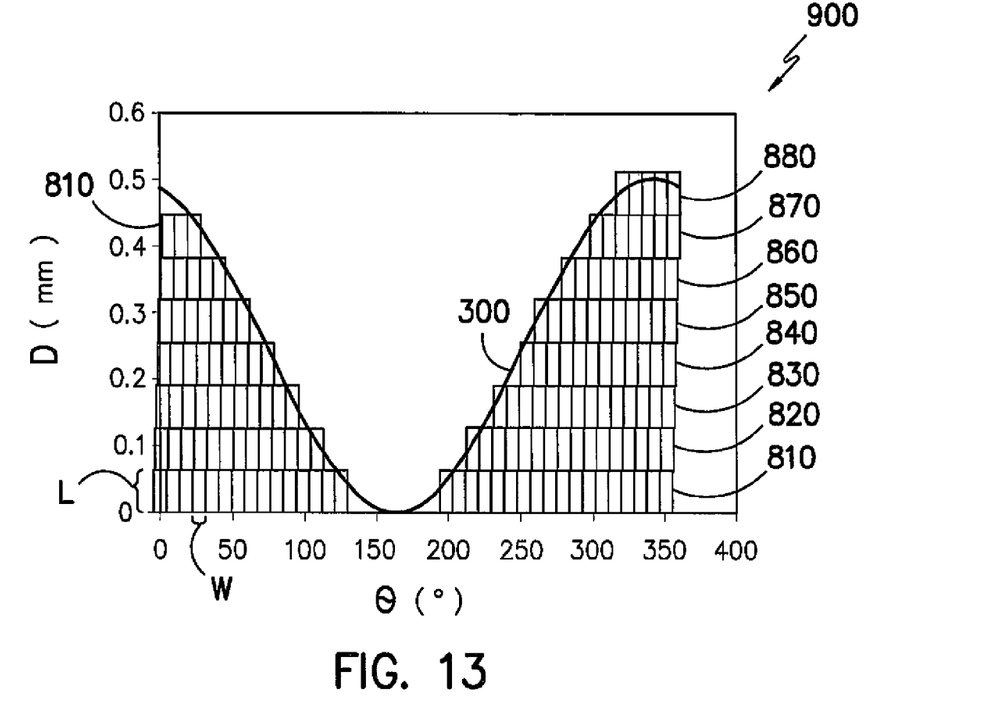

As one example, FIG. 13 depicts an exemplary ablation segment stack 900 used to achieve a desired ablation pattern 300 according to an exemplary embodiment of the present disclosure. The ablation segment stack includes a plurality of discrete ablation segments 800 arranged into layers 810, 820, 830, 840, 850, 860, 870, and 880 to achieve the desired ablation pattern 300. Each of the discrete ablation segments 800 is assigned a specific address on the bead of the tire at an angular location centered relative to the ablation segment. A direct address command is generated for each of the discrete ablation segments 800 in the ablation segment stack 900. The ablation pattern 300 is achieved by controlling an ablation device to selectively remove tire material from the discrete ablation segments 800 pursuant to the direct address commands.

Figure 12:
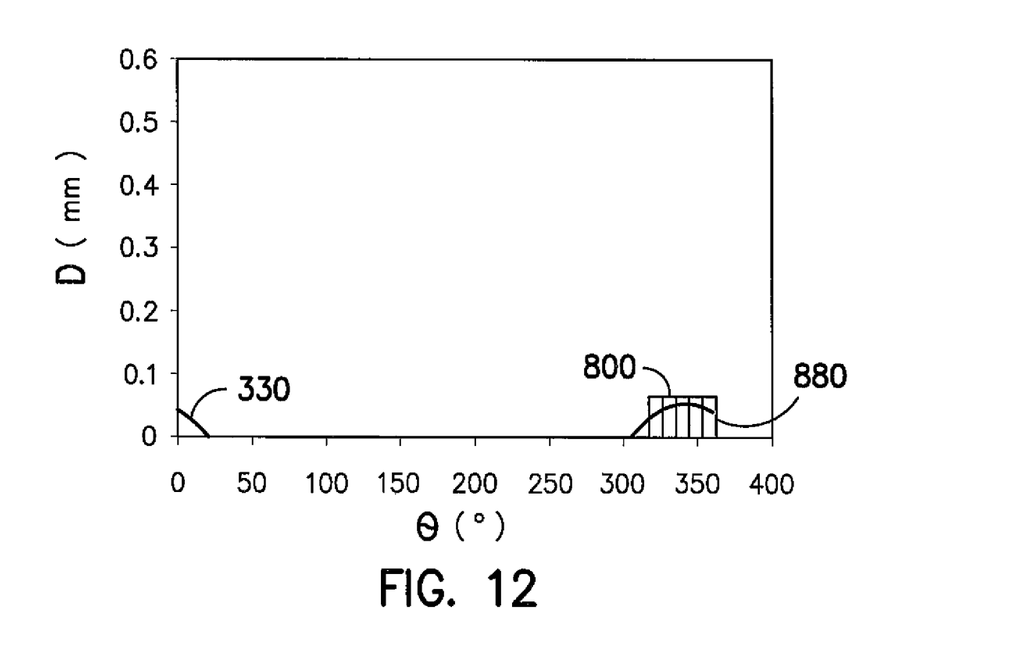

As illustrated in FIG. 12, each of the discrete ablation segments 800 includes a similar ablation segment width W and a similar ablation segment length L. The ablation segment width W is defined by the angular width of the ablation segment relative to the bead of the tire. The ablation segment length L is determined as a function of the ablation sensitivity characteristics associated with the discrete ablation segments. The ablation sensitivity characteristics can include the ablation force per pass and/or the ablation depth per pass of the ablation device. The ablation sensitivity characteristics can be controlled using operating parameters of the ablation device. For instance, the discrete ablation segments can provide a greater ablation depth per pass for an ablation device operating at about 100% power relative to the ablation depth per pass for an ablation device operating at less than about 100% power, such as at about 50% power.

According to aspects of the present disclosure, the plurality of discrete ablation segments used to achieve a desired ablation pattern can have similar ablation sensitivity characteristics such that each of the discrete ablation segments have similar ablation segment lengths (i.e. provide similar ablation depths). In this manner, the plurality of ablation segments can be stacked in discrete layers, as shown in FIG. 12, to achieve a desired ablation pattern. In one example, the plurality of ablation segments can have ablation sensitivity characteristics associated with the full operating power of the ablation device so that a fewer number of ablation segments are required to achieve the desired ablation pattern.

A direct address command is generated for each discrete ablation segment used to achieve the desired ablation pattern. The direct address command can specify a laser power, scan rate, bit map, radial location, or other suitable parameter for the ablation segment. An exemplary list of direct address commands is provided below:

| Command No. | Angular Location (Address) | Power | Scan Rate | Bit Map |
|---|---|---|---|---|
| 1 | 15.8 | 100 | 4000 | BMP1 |
| 2 | 15.8 | 100 | 4000 | BMP2 |
| 3 | 26.3 | 100 | 4000 | BMP1 |
| 4 | 27.5 | 95 | 4000 | BMP1 |
| 5 | 27.5 | 100 | 3000 | BMP2 |
| 6 | 28.6 | 80 | 4000 | BMP1 |
| 7 | 28.6 | 100 | 4000 | BMP2 |
| 8 | 36.9 | 100 | 4000 | BMP1 |

While only eight direct address commands are listed above, those of ordinary skill in the art, using the disclosures provided herein should understand that the number of direct address commands will vary depending on the desired ablation pattern for the bead of the tire.

Each of the exemplary direct address command above specifies ablation parameters for a discrete ablation segment on the tire bead. For example, Direct Address Command No. 1 directs the ablation device to go to 15.8° from the zero reference and burn a bitmap BMP1 at a 100% power using a scan rate of 4000. Direct Address Command No. 2 directs the ablation device to stay at 15.8° from the zero reference and burn a bitmap BMP2 at a 100% power using a scan rate of 4000. The choice of bitmap specified in each direct address command can allow for the selection of a specific ablation track on the bead of the tire. For example, the bitmap BMP1 can specify that the ablation device is to burn an ablation segment on the bead seat of the bead. The bitmap BMP2 can specify that the ablation device is to burn an ablation segment on the lower flange portion or upper flange portion of the bead. Alternatively, the radial position for ablation could be specified by another independent parameter rather than being built into the bitmap file. In this manner, the direct address commands can provide for the ablation of multiple tracks along the bead of the tire using a single pass of the ablation device.

Referring back to the example above, Direct Address Command No. 3 directs the ablation device to go to 26.3° from the zero reference and burn a bitmap BMP1 at a 100% power using a scan rate of 4000. Direct Address Command No. 4 directs the ablation device to go to 27.5° from the zero reference and burn a bitmap BMP1 at a 95% power using a scan rate of 4000. Direct Address Command No. 5 directs the ablation device to 27.5° from the zero reference and burn a bitmap BMP2 at a 100% power using a scan rate of 3000. Direct Address Commands Nos. 6-8 provide similar control directives to the ablation device. As demonstrated, ablation device can be controlled to directly go to areas on the bead of the tire and to skip over significant sections of the bead that do not require ablation, leading to reduced processing time.

Figure 8:
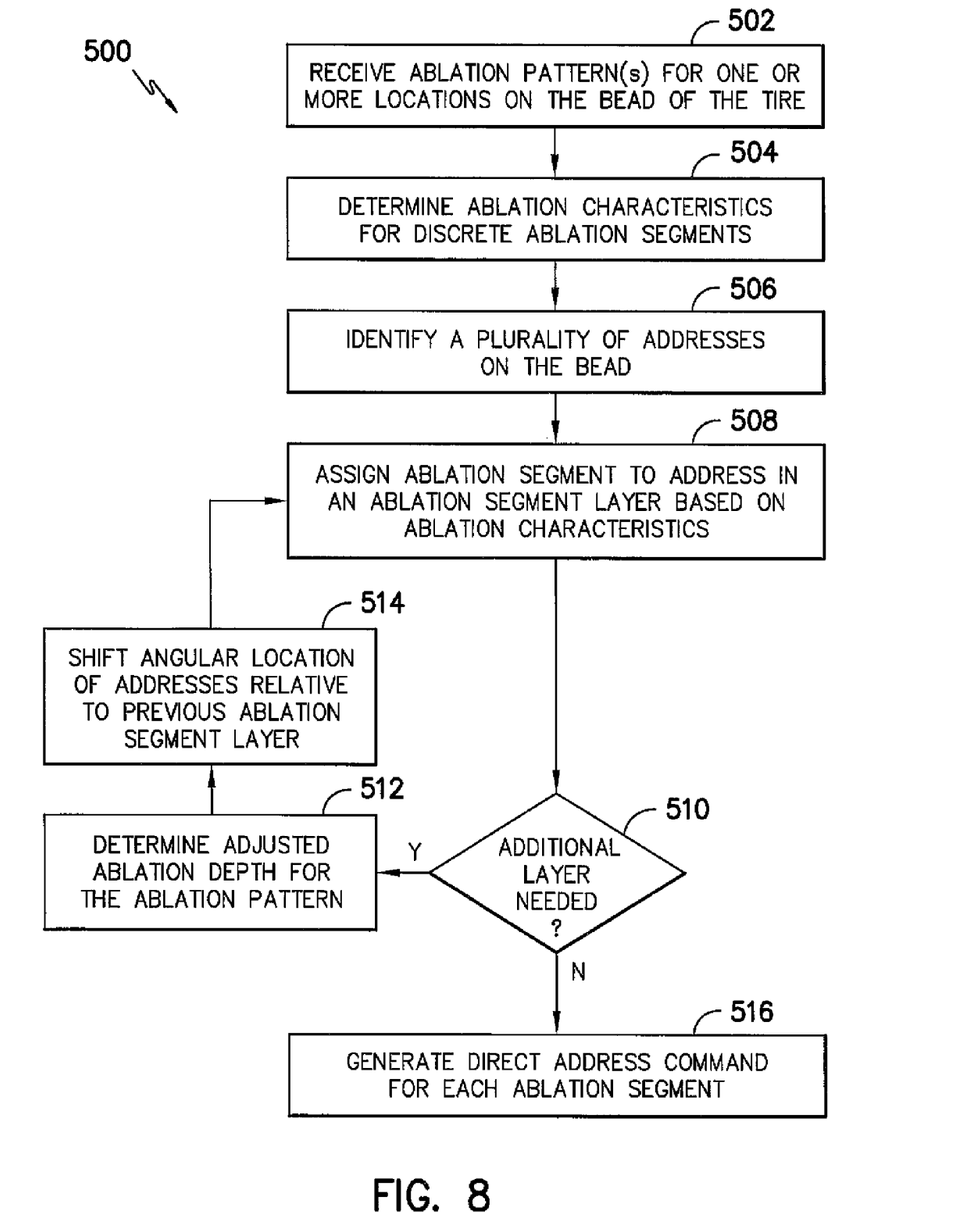
FIG. 8 depicts an exemplary flow diagram of a method of generating a plurality of direct address commands to control the ablation of a tire bead according to an exemplary embodiment of the present disclosure.

FIG. 8 depicts an exemplary method 500 for generating a plurality of direct address commands to achieve a desired ablation pattern according to an exemplary aspect of the present disclosure. At (502) the method includes receiving one or more ablation patterns for the bead of the tire. Receiving an ablation pattern can include receiving and/or obtaining a calculated ablation pattern from any suitable source. For instance, receiving an ablation pattern can include receiving a pre-calculated or predetermined ablation pattern from a computing device or a component of a computing device. Receiving an ablation pattern can also include calculating an ablation pattern according to any suitable technique. An exemplary technique for calculating an ablation pattern is disclosed in WO 2011/002596, which is incorporated herein by reference for all purposes.

The ablation pattern can be calculated or determined to reduce selected harmonics of one or more uniformity parameters for the tire. In a particular implementation, a plurality of ablation patterns associated with one or more tracks along the bead portion of the tire can be received for use in reducing selected harmonics of one or more uniformity parameters.

At (504), the method determines ablation characteristics for the discrete ablation segments that are going to be used to achieve the one or more ablation patterns. The ablation characteristics can include, for instance, the ablation segment width of each of the ablation segment and the ablation segment length for each of the ablation segments. In one example, the ablation segment width can be provided as the number of data points per ablation segment or number of degrees per ablation segment.

The ablation segment length of the discrete ablation segments provides a measure the ablation sensitivity characteristics of the ablation segments, such as the ablation segment depth provided by the ablation segment. The ablation segment length of the discrete ablation segments can be determined as a function of an operating parameter of the ablation device, such as the power or scan rate of the ablation device.

Other suitable ablation parameters can also be determined at (504), including data spacing per point (e.g. bead circumference/number of data points in the ablation pattern); degrees per point (e.g. 360/number of data points in the ablation pattern); and a point shift parameter. The point shift parameter can be used to shift addresses of ablation segment layers in the ablation segment stack to provide smooth edges on the bead of the tire.

At (506), the method identifies a plurality of addresses around the bead of the tire. The plurality of addresses can be determined based at least in part on the ablation segment width associated with the discrete ablation segments. In a particular embodiment, the method can estimate the number of times that a discrete ablation segment would fit around the bead. This number will represent the number of addresses that will be used for the purpose of generating direct address commands.

At (508), the method assigns discrete ablation segments to one or more of the plurality of addresses). More particularly, the method makes a determination whether to assign a particular discrete ablation segment to an address based at least in part on ablation sensitivity characteristics, such as ablation segment depth, associated with the discrete ablation segment. In one example, the method can assign a discrete ablation segment to an address if the desired ablation depth defined by the ablation pattern exceeds a certain percentage, such as about 50%, of the ablation segment depth associated with the discrete ablation segment.

Figure 9:
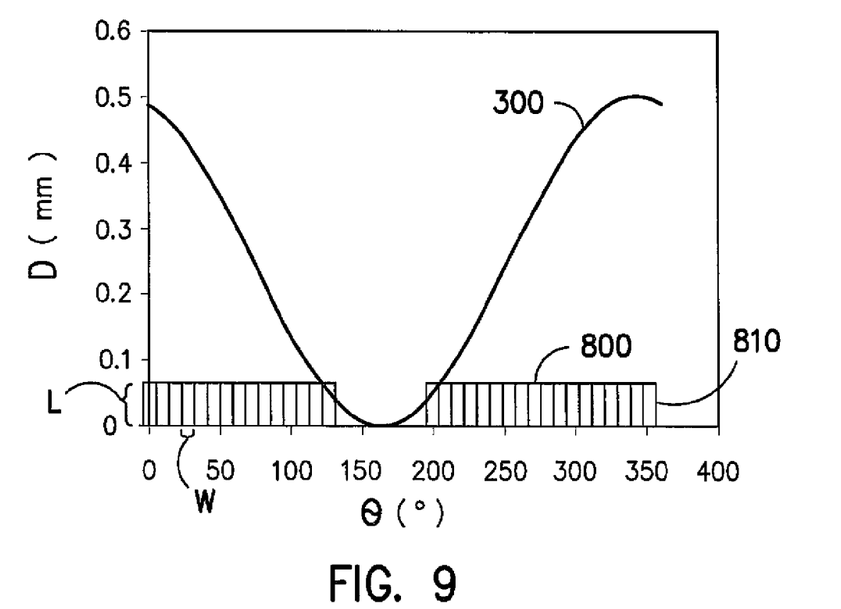

FIG. 9 illustrates this concept. As shown in FIG. 9, a plurality of discrete ablation segments 800 have been assigned to a plurality of addresses in a first ablation segment layer 810. The discrete ablation segments 800 are assigned to addresses where the desired ablation depth defined by exemplary ablation pattern 300 exceeds more than 50% of the ablation segment depth (graphically represented by the ablation segment length L). The identical lengths of the ablation segments 800 in the first layer 810 demonstrate that each of the plurality of ablation segments 800 in the first layer 810 have similar ablation sensitivity characteristics.

As further illustrated in FIG. 9, the ablation segments 800 arranged in the first ablation segment layer 810 are not sufficient to achieve the ablation pattern 300. Accordingly, additionally, ablation segment layers will have to be stacked or arranged on top of ablation segment layer 810 to achieve the desired ablation depth at each address. A loop algorithm, discussed in more detail below, can be used to assign additional discrete ablation segments to additional ablation segment layers until an ablation segment stack sufficient to achieve a desired ablation pattern is reached.

The loop algorithm begins at (510), where the method determines whether additional ablation segment layers are necessary to achieve the desired ablation pattern. The method can determine that additional ablation segment layers are necessary if the desired ablation segment depth at a particular address exceeds the sum of all ablation segment depths associated with discrete ablation segments at the particular address.

If additional ablation segments are necessary, the method determines an adjusted ablation depth for the ablation pattern (512). The adjusted ablation depth can be determined by subtracting the ablation segment depth of the ablation segments in the previous layer from the desired ablation depth defined by the ablation pattern 300. An exemplary adjusted ablation pattern 310 is illustrated in FIG. 10.

At (514), the method shifts the addresses for the additional ablation segment layer relative to the previous ablation segment layer. This amount of the shift can be determined by a point shift parameter determined or specified at (504). The point shift parameter provides that addresses associated with the additional ablation segment layer are shifted a specified number of degrees relative to the addresses of the previous ablation segment layer. This ensures that edges of stacked ablation segment layers are not aligned, reducing the appearance of sharp edges in an ablation pattern provided on the tire. FIG. 13 provides an exemplary illustration of an ablation segment stack 900 including ablation segment layers 820, 930, 840, 850, 860, 870, and 880 having addresses that are shifted relative to the immediately preceding ablation segment layers.

Once the shifted addresses have been determined, the method returns to (508) where a plurality of discrete ablation segments are assigned to specific addresses in the additional ablation segment layer based at least in part on ablation sensitivity characteristics, such as ablation depth. Similar to the first ablation segment layer, the method can assign a discrete ablation segment to an address if the adjusted ablation depth defined by the adjusted ablation pattern exceeds a certain percentage, such as about 50%, of the ablation segment depth associated with the discrete ablation segment.

Figure 10:
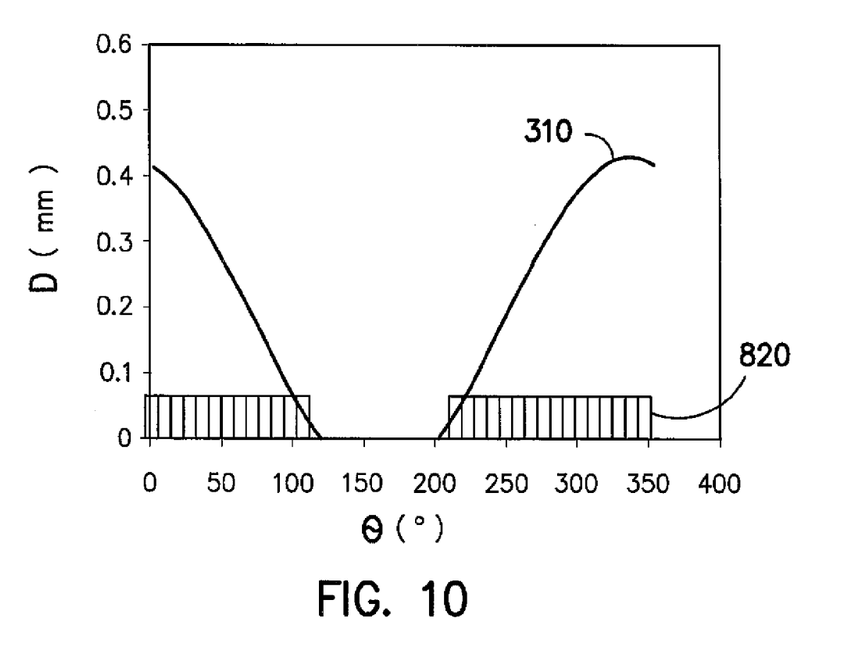

FIG. 10 illustrates a plurality of ablation segments 800 assigned to a plurality of addresses in a second ablation segment layer 820. As shown, the discrete ablation segments 800 are assigned to addresses where the adjusted ablation depth defined by exemplary adjusted ablation pattern 310 exceeds more than 50% of the ablation segment depth. The method then again determines whether additional ablation segment layers are necessary (510).

Figure 11:
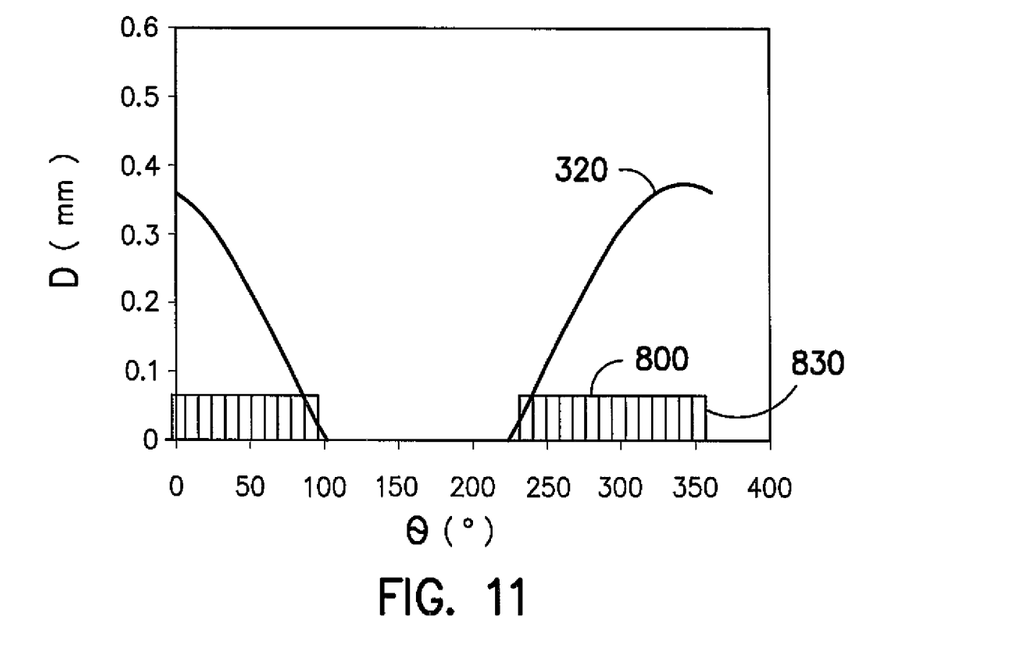

As graphically depicted in FIGS. 11 and 12, this process is repeated until the required number of ablation segment layers is reached to achieve the desired ablation pattern 300. For instance, FIG. 11 depicts a plurality of ablation segments 800 assigned to addresses in a third ablation segment layer 830 at addresses where the adjusted ablation depth defined by exemplary adjusted ablation pattern 320 exceeds more than 50% of the ablation segment depth. FIG. 12 depicts a plurality of ablation segments 800 assigned to addresses in an eighth ablation segment layer 880 at addresses where the adjusted ablation depth defined by exemplary adjusted ablation pattern 330 exceeds more than 50% of the ablation segment depth.

FIG. 13 depicts an exemplary ablation stack 900 determined according to method discussed above. As shown, exemplary ablation stack 900 includes eight ablation segment layers 810, 820, 830, 840, 850, 860, 870, and 880. The ablation segment layers each include a plurality of discrete ablation segments 800 assigned to a specific address. The addresses of ablation segments in any given ablation segment layer are shifted relative to the addresses of the ablation segments in the immediately preceding layer to provide a smooth ablation pattern on the bead of the tire. As shown in FIG. 13, the desired ablation pattern 300 can achieved by incrementally removing tire materials from the discrete ablation segments depicted in the ablation segment stack 900.

Referring back to FIG. 8 at (516), the method generates a direct address command for each ablation segment assigned to an address. As discussed above, the direct address command specifies operating parameters for each ablation segment at a particular address on the bead of the tire. In accordance with aspects of the present disclosure, direct address commands for multiple ablation patterns along one or more tracks along the bead, such as along one or more of the bead seat, lower flange portion or upper flange portion of the bead can be determined. Once a global list of direct address commands has been generated for each ablation pattern, the global direct address command list is sorted by address and provided to a control system to control ablation of the tire.

The discrete ablation segments illustrated in the exemplary ablation segment 900 of FIG. 13 have ablation sensitivity characteristics that provide a maximum force and/or depth per pass of the ablation device. In this manner, a reduced number of discrete ablation segments are required to achieve the desired ablation pattern. In certain cases, however, it can be desirable to use ablation segments having ablation sensitivity characteristics providing a reduced force and/or depth per pass.

Figure 14:
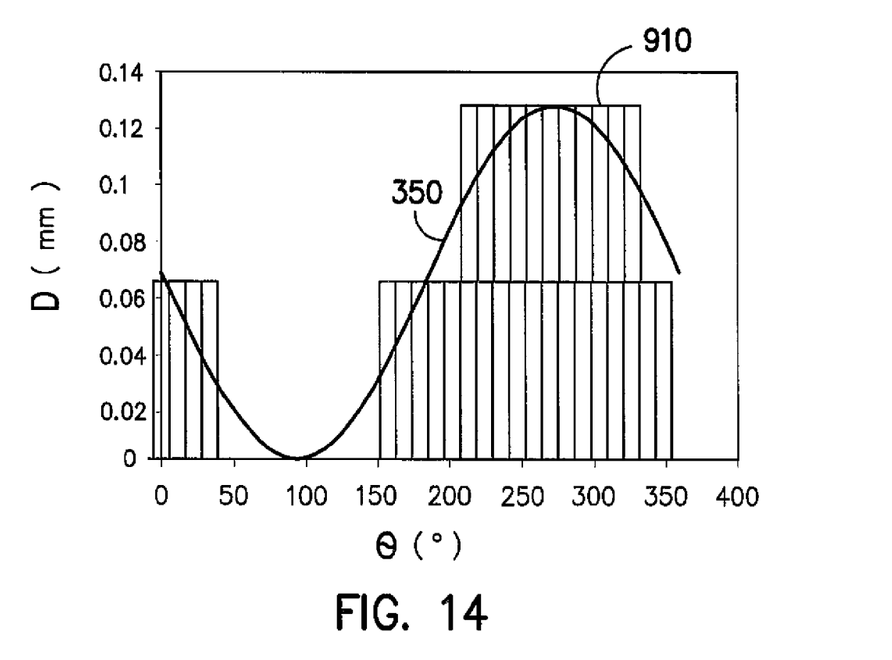

For instance, FIG. 14 depicts an exemplary ablation segment stack 910 determined to achieve an exemplary ablation pattern 350. The exemplary ablation pattern 350 is relatively shallow in that it requires only two ablation segment layers in the ablation segment stack 910 to achieve the desired ablation pattern. As shown in FIG. 14, however, the correlation between the desired ablation pattern 350 and the ablation pattern provided by the ablation segment stack 910 is relatively poor.

To remedy this deficiency, the ablation sensitivity characteristics of the ablation segments can be adjusted such that the ablation segment depths associated with the ablation segments are reduced. For instance, the power or scan rate of the ablation device can be adjusted such that the ablation segments provide reduced force and/or depth per pass. In this manner, more ablation segment layers are required to achieve the desired ablation pattern. In a particular implementation, the ablation sensitivity characteristics of the ablation device can be adjusted such that at least four ablation segment layers are required to achieve the desired ablation pattern.

Figure 15:
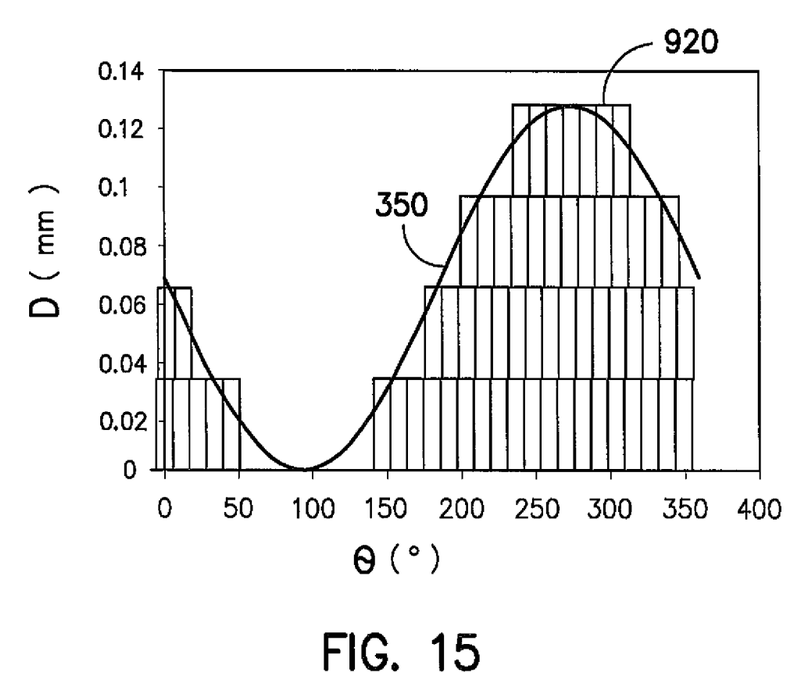

FIG. 15 depicts an exemplary ablation stack 920 including a plurality of ablation segments having reduced ablation segment length as a result of adjusted ablation sensitivity characteristics. As shown, four ablation segment layers are required to achieve the ablation pattern 350. The correlation between the desired ablation pattern 350 and the ablation pattern provided by the ablation segment stack 920 is improved as a result of the increased number of ablation segment layers in the ablation segment stack 920.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for reducing one or more harmonics of at least one uniformity parameter in a cured tire, comprising:
   receiving an ablation pattern for a bead of the tire, the ablation pattern defining a desired ablation depth relative to an angular location around the bead and calculated to correct for one or more harmonics of at least one uniformity parameter for the tire;
   identifying a plurality of addresses for the bead, each address being associated with a specific angular location on the bead of the tire;
   analyzing the ablation pattern to determine a plurality of direct address commands to achieve the ablation pattern, the plurality of direct address commands specifying ablation parameters for a plurality of discrete ablation segments at one or more addresses along the bead of the tire; each of the plurality of discrete ablation segments having similar ablation sensitivity characteristics, the discrete ablation segments stacked into a plurality of discrete layers;
   controlling the ablation device to selectively remove tire material from the bead in discrete ablation segments pursuant to the direct address commands to achieve the ablation pattern.

2. The method of claim 1, wherein the ablation sensitivity characteristics comprise an ablation segment depth associated with the discrete ablation segments.

3. The method of claim 2, wherein the ablation segment depth of the plurality of discrete ablation segments is associated with about full operating power of the ablation device.

4. The method of claim 1, wherein analyzing the ablation pattern to determine a plurality of direct address commands comprises:
   assigning a discrete ablation segment to an address based at least in part on ablation sensitivity characteristics associated with the ablation segment; and
   generating a direct address command for each discrete ablation segment assigned to an address.

5. The method of claim 1, wherein analyzing the ablation pattern to determine a plurality of direct address commands comprises:
   assigning one or more discrete ablation segments to at least one of the plurality of addresses in a first ablation segment layer based at least in part on an ablation segment depth associated with the discrete ablation segments;
   subtracting the ablation segment depth of the discrete ablation segments in the first layer from the desired ablation depth at each address to achieve an adjusted ablation depth for each address; and
   assigning discrete ablation segments to at least one of the plurality of addresses in a second ablation segment layer based at least in part on the adjusted ablation depth.

6. The method of claim 5, wherein the angular locations associated with the addresses of the discrete ablation segments in the first layer are shifted relative to the angular locations associated with the addresses of the discrete ablation segments in the second layer.

7. The method of claim 5, wherein the discrete ablation segments are arranged in at least four ablation segment layers to achieve the ablation pattern.

8. The method of claim 5, wherein the method comprises adjusting the ablation sensitivity characteristics of the discrete ablation segments such that at least four ablation segment layers are required to achieve the ablation pattern.

9. The method of claim 1, wherein each direct address command specifies a laser power, laser scan rate, bitmap or a radial location on the bead for an ablation segment.

10. The method of claim 1, wherein the method comprises selectively removing material to achieve a plurality of ablation patterns for the bead, each pattern in the plurality of ablation patterns designed for ablation at a different track location on the bead in at least one or more of the bead seat, low flange zone and high flange zone of the bead.

11. The method of claim 10, wherein the tire material is selectively removed to achieve the plurality ablation patterns using a single pass of the ablation device around the bead.

12. A uniformity correction system for reducing the magnitude of one or more harmonics of at least one uniformity parameter in a tire according to an ablation pattern for a bead of the tire, the ablation pattern defining a desired ablation depth relative to an angular location around the bead, the system comprising:
a tire fixture on which a tire can be securely mounted;
an ablation device configured to provide ablation of the bead of a tire mounted on the tire fixture;
a control system coupled to the ablation device, the control system configured to control the ablation device pursuant to a plurality of direct address commands to selectively remove material in discrete ablation segments at specific angular addresses along the bead to achieve the ablation pattern, the discrete ablation segments stacked into a plurality of discrete layers;
wherein the control system controls the ablation device to selectively remove tire material according to a plurality ablation patterns for the bead using a single pass of the ablation device around the bead, each ablation pattern in the plurality of ablation patterns designed for ablation at a different track location in at least one or more of the bead seat, low flange zone and high flange zone of the bead.

13. The system of claim 12, wherein the plurality of direct address commands specify ablation parameters for discrete ablation segments at one or more addresses along the bead of the tire, each of the plurality of discrete ablation segments having similar ablation sensitivity characteristics.

14. The system of claim 12, wherein the control system is configured to analyze the ablation pattern to determine the plurality of direct address commands.

15. The system of claim 12, wherein the system comprises a second ablation device configured to provide ablation of a second bead of a tire mounted on the tire fixture, the control system configured to independently control ablation of the second bead with the second ablation device.

* * * * *